US010528822B2

(12) United States Patent
Liu et al.

(10) Patent No.: US 10,528,822 B2
(45) Date of Patent: Jan. 7, 2020

(54) VISITOR GROUPING METHOD AND IMAGE PROCESSING DEVICE

(71) Applicant: VIVOTEK INC., New Taipei (TW)

(72) Inventors: Cheng-Chieh Liu, New Taipei (TW); Chao-Ming Chang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 166 days.

(21) Appl. No.: 15/936,361

(22) Filed: Mar. 26, 2018

(65) Prior Publication Data
US 2018/0285655 A1 Oct. 4, 2018

(30) Foreign Application Priority Data
Mar. 31, 2017 (TW) .............................. 106110981 A (51) Int. Cl.
*G06K 9/00* (2006.01)
*G06T 7/70* (2017.01)
*G06T 7/00* (2017.01)

(52) U.S. Cl.
CPC ..... *G06K 9/00778* (2013.01); *G06K 9/00677* (2013.01); *G06T 7/70* (2017.01); *G06T 7/97* (2017.01); *G06T 2207/10016* (2013.01); *G06T 2207/30196* (2013.01); *G06T 2207/30241* (2013.01)

(58) Field of Classification Search
CPC .. G06K 9/00677; G06K 9/00778; G06T 7/70; G06T 7/97; G06T 2207/30196; G06T 2207/30232; G06T 2207/30241
See application file for complete search history.

(56) References Cited

U.S. PATENT DOCUMENTS

| 2002/0070865 | A1 | 6/2002 | Lancos et al. ............. 340/573.1 |
| 2003/0107649 | A1* | 6/2003 | Flickner et al. ... G06K 9/00362 348/150 |
| 2012/0105644 | A1 | 5/2012 | Purvis et al. .................. 348/159 |
| 2014/0122170 | A1 | 5/2014 | Padgett et al. .......... G06Q 50/12 |
| 2017/0076157 | A1* | 3/2017 | Vazquez et al. ... G06K 9/00778 |
| 2017/0169297 | A1* | 6/2017 | Bernal et al. ...... G06K 9/00369 |

FOREIGN PATENT DOCUMENTS

TW M529910 U 10/2016 ............. G08B 21/22

* cited by examiner

*Primary Examiner* — Andrew W Johns
(74) *Attorney, Agent, or Firm* — Winston Hsu (57) ABSTRACT

A visitor grouping method determines whether different visitors belong to an identical group according to a distance between the visitors and an initial position of the visitors in an image sequence, so as to analyze a proportion of number of individual visitors to number of grouped visitors. Furthermore, the visitor grouping method may further determine whether two groups belong to an identical group according to a distance between the groups and an initial position of the groups in the image sequence. Moreover, the visitor grouping method may determine whether a child group exists and then merge the child group with other groups. Accordingly, a specific site may design the display content and manner with respect to the properties of the visitors, so as to enhance service quality and operating efficiency.

18 Claims, 11 Drawing Sheets

VISITOR GROUPING METHOD AND IMAGE PROCESSING DEVICE

BACKGROUND OF THE INVENTION

1. Field of the Invention

The invention relates to a visitor grouping method and an image processing device and, more particularly, to a visitor grouping method and an image processing device capable of grouping visitors effectively.

2. Description of the Prior Art

As the age of big data comes, it has a tendency to use and analyze objective data to review or enhance service quality and operating efficiency of a specific site. The specific site (e.g. museum) may design the display content and manner with respect to the properties of the visitors by analyzing a proportion of number of individual visitors to number of grouped visitors and a proportion of number of all visitors in different groups. Furthermore, a retail store may estimate the operating efficiency by analyzing a proportion of number of purchasers to number of all visitors (i.e. conversion rate). If many visitors belong to a family, only one of the visitors representing the family pays. That is to say, a family is a shopping unit and a single purchaser is a shopping unit as well. Accordingly, how to group visitors effectively has become a significant issue.

SUMMARY OF THE INVENTION

An objective of the invention is to provide a visitor grouping method and an image processing device capable of grouping visitors effectively, so as to solve the aforesaid problems.

According to an embodiment of the invention, a visitor grouping method comprises steps of receiving an image sequence, wherein a first visitor and a second visitor exist in the image sequence; determining whether a distance between the first visitor and the second visitor at a first identical time point is smaller than a first distance threshold; when determining that the distance between the first visitor and the second visitor at the first identical time point is smaller than the first distance threshold, determining whether a distance between a first initial position of the first visitor in the image sequence and a second initial position of the second visitor in the image sequence is smaller than a second distance threshold; when determining that the distance between the first initial position and the second initial position is smaller than the second distance threshold, calculating a first time interval as the distance between the first visitor and the second visitor is larger than or equal to the first distance threshold every time after the first identical time point; determining whether the first time interval is smaller than a time threshold; and when determining that the first time interval is smaller than a time threshold, determining that the first visitor and the second visitor belong to an identical group.

According to another embodiment of the invention, an image processing device comprises an image receiver and a processor. The image receiver receives an image sequence, wherein a first visitor and a second visitor exist in the image sequence. The processor is electrically connected to the image receiver. The processor determines whether a distance between the first visitor and the second visitor at a first identical time point is smaller than a first distance threshold. When the processor determines that the distance between the first visitor and the second visitor at the first identical time point is smaller than the first distance threshold, the processor determines whether a distance between a first initial position of the first visitor in the image sequence and a second initial position of the second visitor in the image sequence is smaller than a second distance threshold. When the processor determines that the distance between the first initial position and the second initial position is smaller than the second distance threshold, the processor calculates a first time interval as the distance between the first visitor and the second visitor is larger than or equal to the first distance threshold every time after the first identical time point. The processor determines whether the first time interval is smaller than a time threshold. When the processor determines that the first time interval is smaller than a time threshold, the processor determines that the first visitor and the second visitor belong to an identical group.

As mentioned in the above, the invention determines whether different visitors belong to an identical group according to the distance between the visitors and the initial position of the visitors in the image sequence, so as to analyze a proportion of number of individual visitors to number of grouped visitors. Accordingly, a specific site may design the display content and manner with respect to the properties of the visitors, so as to enhance service quality and operating efficiency. Furthermore, a retail store may estimate the operating efficiency by analyzing a proportion of number of purchasers to number of all visitors.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
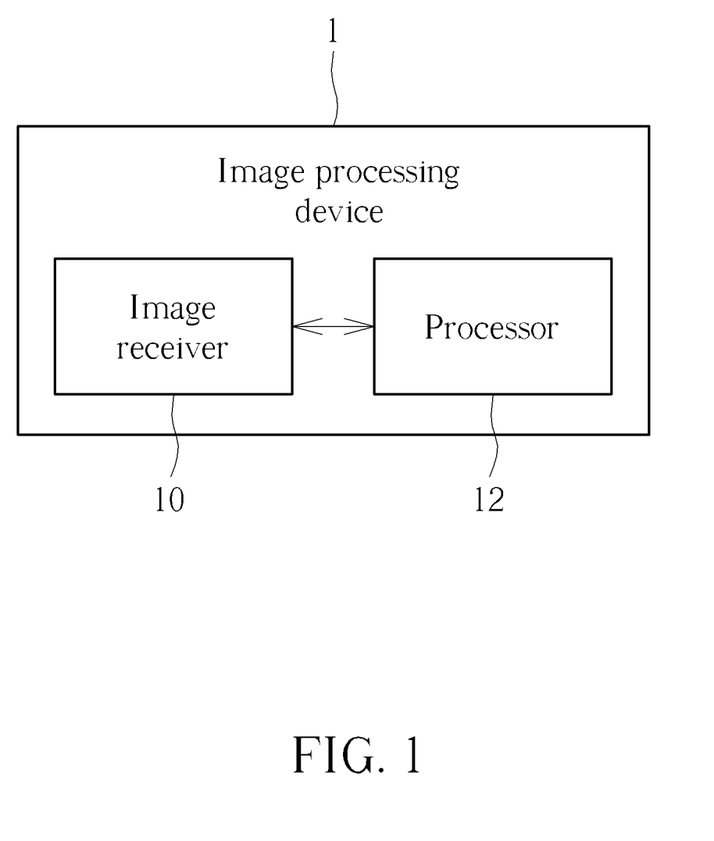
FIG. 1 is a functional block diagram illustrating an image processing device according to an embodiment of the invention.
Figure 2:
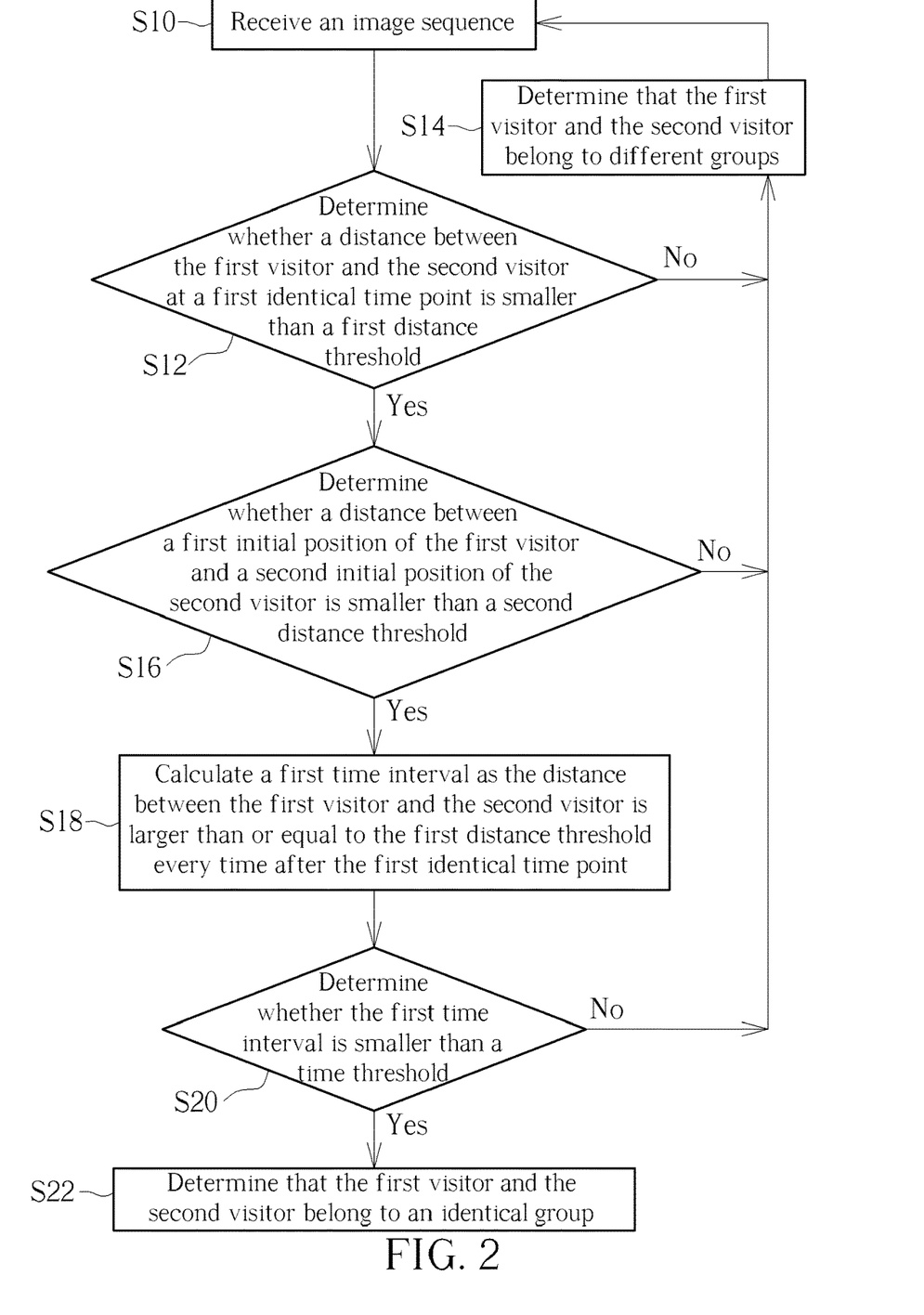
FIG. 2 is a flowchart illustrating a visitor grouping method according to an embodiment of the invention.
Figure 3:
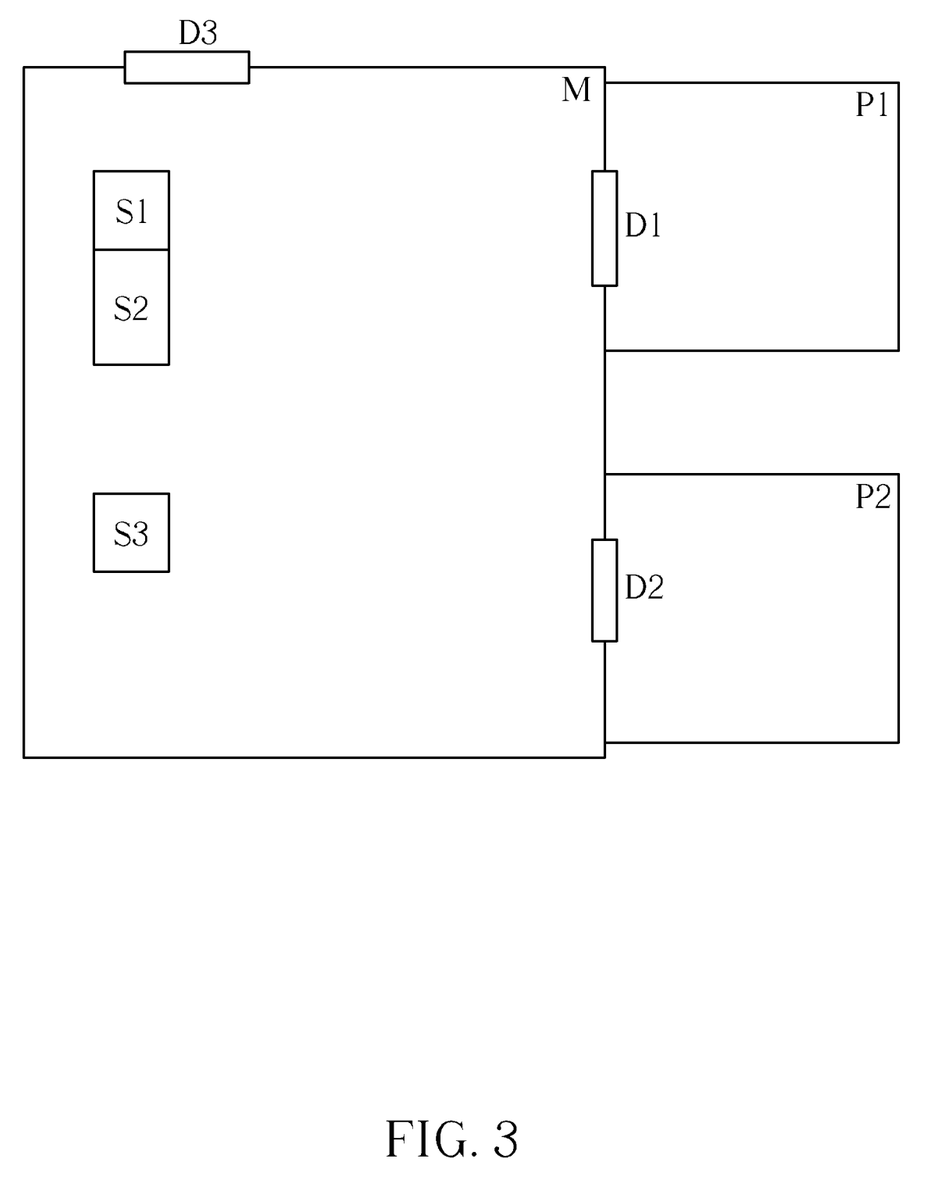
FIG. 3 is a schematic top view illustrating a shopping mall according to an embodiment of the invention.

Referring to FIGS. 1 to 3, FIG. 1 is a functional block diagram illustrating an image processing device 1 according to an embodiment of the invention, FIG. 2 is a flowchart illustrating a visitor grouping method according to an embodiment of the invention, and FIG. 3 is a schematic top view illustrating a shopping mall M according to an embodiment of the invention. The visitor grouping method shown in FIG. 2 may be applied to the image processing device 1 shown in FIG. 1.

As shown in FIG. 1, the image processing device 1 comprises an image receiver 10 and a processor 12, wherein the processor 12 is electrically connected to the image receiver 10. In this embodiment, the image processing device 1 may be a camera. In practical applications, the image receiver 10 may be a charge-coupled device (CCD) sensor or a complementary metal-oxide semiconductor (CMOS) sensor; the processor 12 may be a processor or a controller with data processing/calculating function. In general, the image processing device 1 may be further equipped with some necessary hardware or software components for specific purposes, such as a circuit board, a power supply, applications, a communication module, a lens, etc., and it depends on practical applications.

As shown in FIG. 3, a first parking lot P1 and a second parking lot P2 may be set up outside the shopping mall M and a plurality of stores S1, S2, S3 may be set up inside the shopping mall M. Furthermore, the shopping mall M has a plurality of entrance/exit gates D1, D2, D3. A visitor parking a vehicle in the first parking lot P1 may enter the shopping mall M through the entrance/exit gate D1. Another visitor parking a vehicle in the second parking lot P2 may enter the shopping mall M through the entrance/exit gate D2. Other visitors may enter the shopping mall M through the entrance/exit gate D3. In this embodiment, the image processing device 1 shown in FIG. 1 may be installed on a ceiling of the shopping mall M shown in FIG. 3 to capture and generate an image sequence of the shopping mall M.

Figure 4:
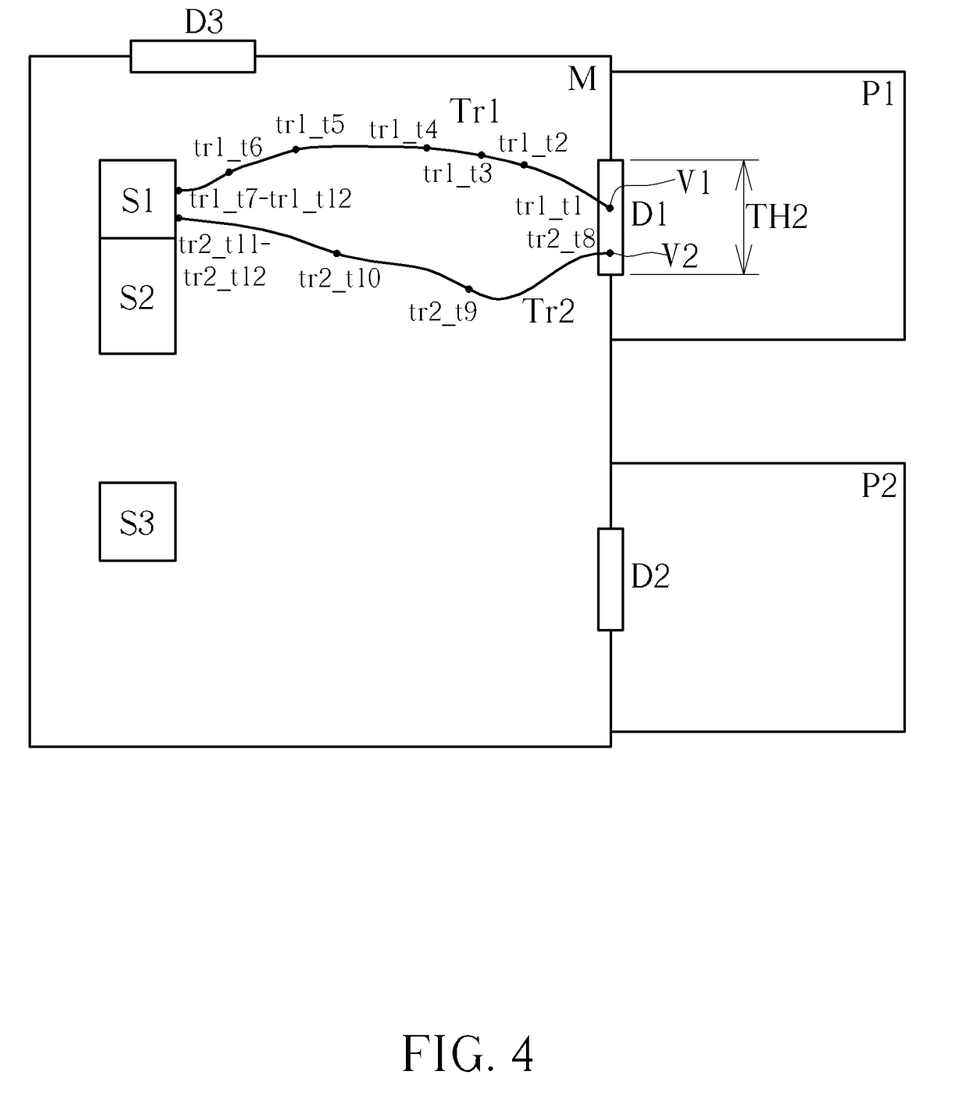
FIG. 4 is a schematic view illustrating the moving trajectories of a first visitor and a second visitor in the shopping mall.
Figure 5:
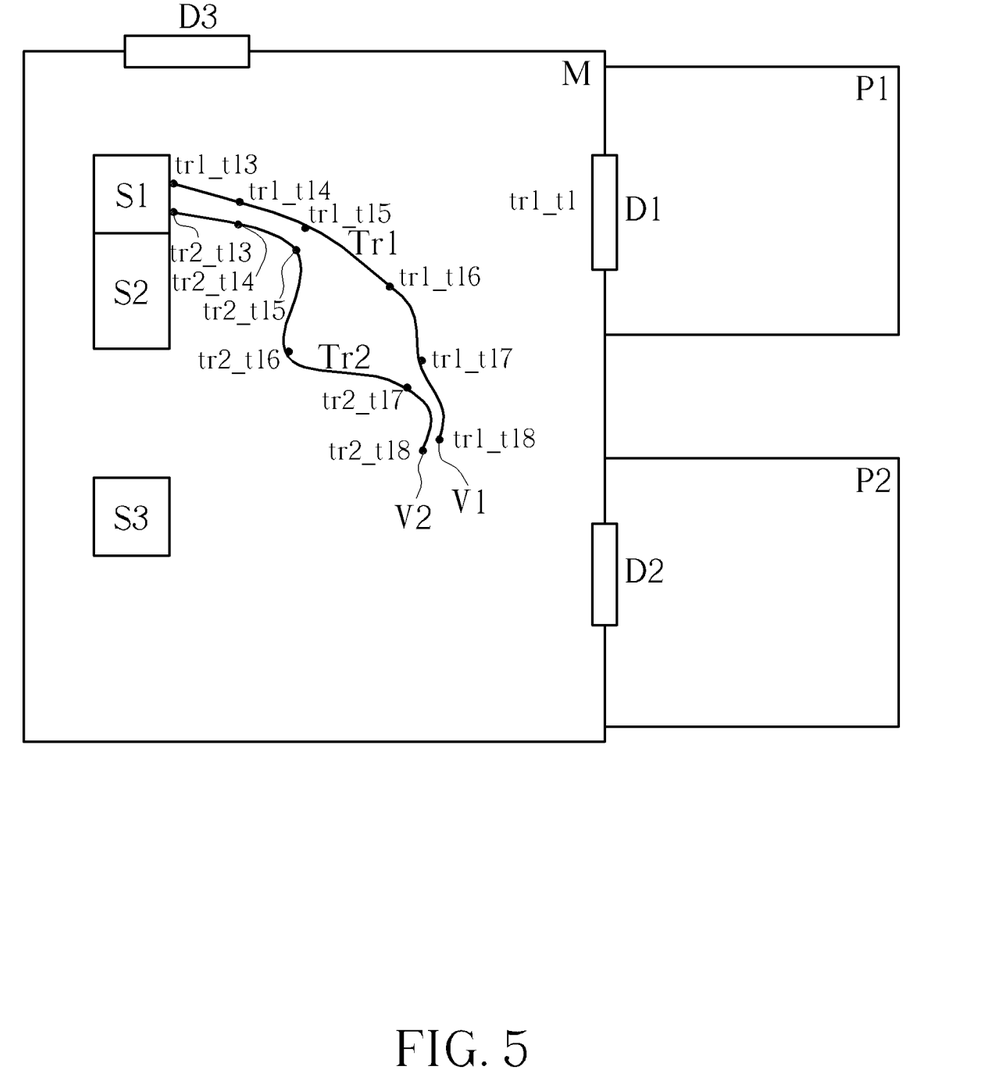
FIG. 5 is another schematic view illustrating the moving trajectories of a first visitor and a second visitor in the shopping mall.

Referring to FIGS. 4 and 5, FIG. 4 is a schematic view illustrating the moving trajectories of a first visitor V1 and a second visitor V2 in the shopping mall M and FIG. 5 is another schematic view illustrating the moving trajectories of a first visitor V1 and a second visitor V2 in the shopping mall M. When using the image processing device 1 to perform the visitor grouping method, first, the image receiver 10 receives an image sequence of the shopping mall M (step S10 in FIG. 2). In this embodiment, after receiving the image sequence, the processor 12 analyzes the image sequence to obtain a moving trajectory of each visitor in the image sequence. As shown in FIGS. 4 and 5, a first visitor V1 and a second visitor V2 exist in the image sequence, wherein the moving trajectory of the first visitor V1 is Tr1 and the moving trajectory of the second visitor V2 is Tr2.

In this embodiment, the first visitor V1 appears in the image sequence first time at the time point t1, wherein the point tr1_t1 represents the position of the first visitor V1 at the time point t1, the point tr1_t2 represents the position of the first visitor V1 at the time point t2, and so on. Furthermore, the second visitor V2 appears in the image sequence first time at the time point t8, wherein the point tr2_t8 represents the position of the second visitor V2 at the time point t8, the point tr2_t9 represents the position of the second visitor V2 at the time point t9, and so on. Moreover, the points tr1_t7-tr1_t12 are labeled at an identical point since the first visitor V1 is motionless at the time points t7-t12, and the points tr2_t11-tr2_t12 are labeled at an identical point since the second visitor V2 is motionless at the time points t11-t12.

After receiving the image sequence, the processor 12 continuously determines whether a distance between every two visitors in the image sequence at an identical time point is smaller than a first distance threshold TH1. As shown in FIG. 4, since only one visitor V1 exists in the image at the time point t1, the processor 12 does not perform the aforesaid determination; since only one visitor V1 exists in the image at the time point t2, the processor 12 does not perform the aforesaid determination; and so n; and since two visitors V1, V2 exist in the image at the time point t8, the processor 12 determines whether the distance between the visitors V1, V2 is smaller than the first distance threshold TH1. In this embodiment, for example, since the proxemics defines a personal distance as 50 cm to 120 cm, the first distance threshold TH1 may be set as, but not limited to, 120 cm. At the time point t8, the processor 12 may determine that the distance between the visitors V1, V2 is not smaller than the first distance threshold TH1. Since two visitors V1, V2 exist in the image at the time point t9, the processor 12 determines whether the distance between the visitors V1, V2 is smaller than the first distance threshold TH1. At the time point t9, the processor 12 may determine that the distance between the visitors V1, V2 is not smaller than the first distance threshold TH1. The processor 12 may perform the aforesaid determination for other time points. Accordingly, for the first visitor V1 and the second visitor V2, the processor 12 will determine whether a distance between the first visitor V1 and the second visitor V2 at a first identical time point is smaller than a first distance threshold TH1 (step S12 in FIG. 2).

When the processor 12 determines that the distance between the first visitor V1 and the second visitor V2 at any identical time point is larger than or equal to the first distance threshold TH1, the processor 12 determines that the first visitor V1 and the second visitor V2 belong to different groups (step S14 in FIG. 2).

As shown in FIG. 4, the distance between the first visitor V1 and the second visitor V2 at the time point t11 is smaller than the first distance threshold TH1, wherein the time point t11 is the aforesaid first identical time point. When the processor 12 determines that the distance between the first visitor V1 and the second visitor V2 at the first identical time point t11 is smaller than the first distance threshold TH1, the processor 12 further determines whether a distance between a first initial position tr1_t1 of the first visitor V1 in the image sequence and a second initial position tr2_t8 of the second visitor V2 in the image sequence is smaller than a second distance threshold TH2 (step S16 in FIG. 2). In this embodiment, a width of the entrance/exit gate D1 of the shopping mall M may be set as the second distance threshold TH2.

When the processor 12 determines that the distance between the first initial position tr1_t1 of the first visitor V1 and the second initial position tr2_t8 of the second visitor V2 is larger than or equal to the second distance threshold TH2, the processor 12 determines that the first visitor V1 and the second visitor V2 belong to different groups (step S14 in FIG. 2).

As shown in FIG. 4, the distance between the first initial position tr1_t1 of the first visitor V1 and the second initial position tr2_t8 of the second visitor V2 is smaller than the second distance threshold TH2. When the processor 12 determines that the distance between the first initial position tr1_t1 of the first visitor V1 and the second initial position tr2_t8 of the second visitor V2 is smaller than the second distance threshold TH2, the processor 12 further calculates a first time interval TP1 as the distance between the first visitor V1 and the second visitor V2 is larger than or equal to the first distance threshold TH1 every time after the first identical time point t11 (step S18 in FIG. 2). As shown in FIGS. 4 and 5, after the first identical time point t11, the distance between the first visitor V1 and the second visitor V2 is larger than or equal to the first distance threshold TH1 at the time point t16 only. The distance between the first visitor V1 and the second visitor V2 is smaller than the first distance threshold TH1 at the time points t12-t15 and t17-t18. If the time interval between every two adjacent time points tn and tn+1 is 1 second, the aforesaid first time interval TP1 is 1 second accordingly.

Then, the processor 12 determines whether the first time interval TP1 is smaller than a time threshold T_TH (step S20 in FIG. 2).

When the processor 12 determines that the first time interval TP1 is larger than or equal to the time threshold T_TH, the processor 12 determines that the first visitor V1 and the second visitor V2 belong to different groups (step S14 in FIG. 2).

It is assumed that the aforesaid time threshold T_TH is set as 5 seconds. Since the first time interval TP1 is 1 second, the first time interval TP1 is smaller than the time threshold T_TH. When the processor 12 determines that the first time interval TP1 is smaller than the time threshold T_TH, the processor 12 determines that the first visitor V1 and the second visitor V2 belong to an identical group (step S22 in FIG. 2).

Figure 6:
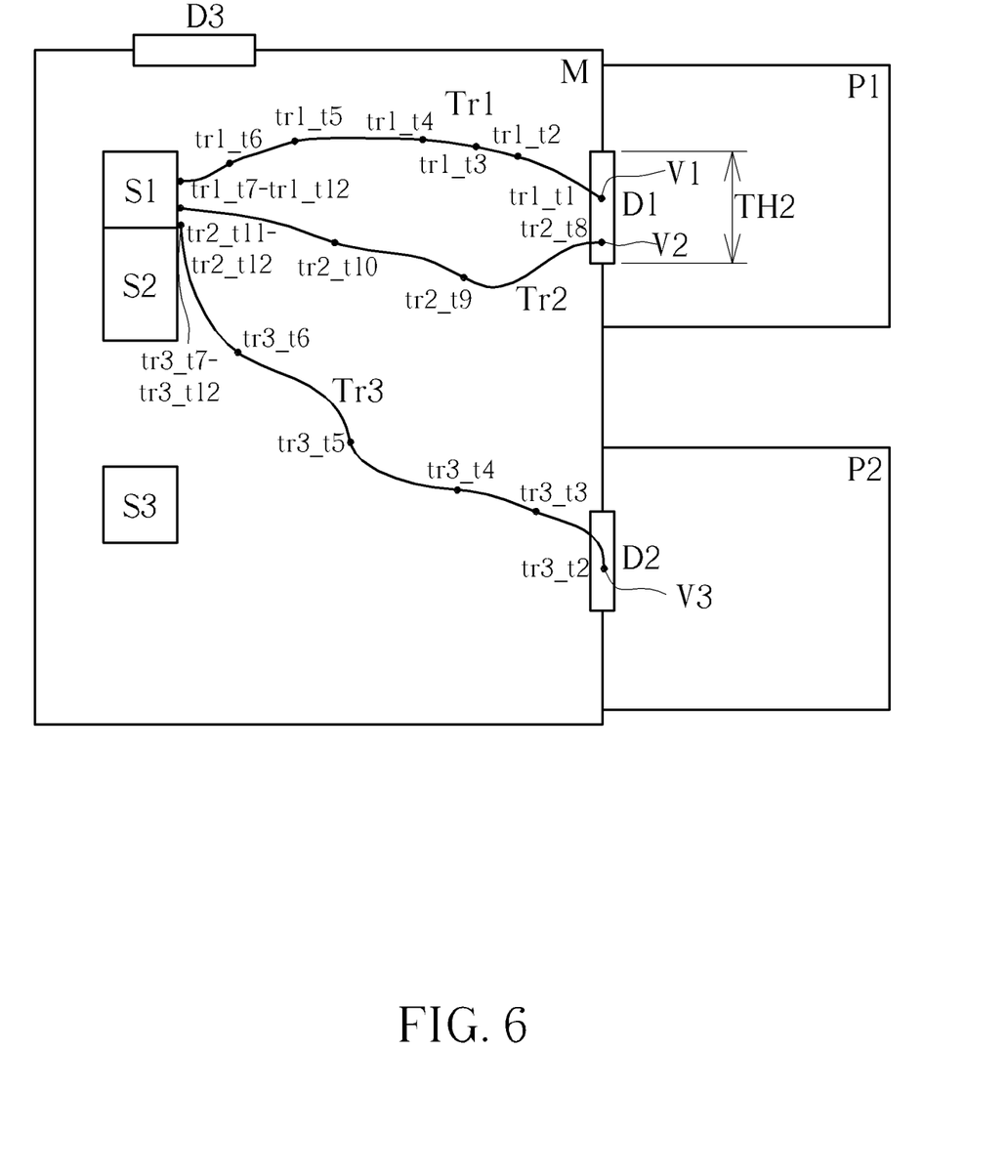
FIG. 6 is another schematic view illustrating the moving trajectories of a first visitor, a second visitor and a third visitor in the shopping mall.

Referring to FIG. 6, FIG. 6 is another schematic view illustrating the moving trajectories of a first visitor V1, a second visitor V2 and a third visitor V3 in the shopping mall M. As shown in FIG. 6, in addition to the moving trajectory Tr1 of the first visitor V1 and the moving trajectory Tr2 of the second visitor V2, a moving trajectory Tr3 of a third visitor V3 further exists in the image sequence. In this embodiment, the third visitor V3 appears in the image sequence first time at the time point t2, wherein the point tr3_t2 represents the position of the third visitor V3 at the time point t2, the point tr3_t3 represents the position of the third visitor V3 at the time point t3, and so on. Furthermore, the points tr3_t7-tr3_t12 are labeled at an identical point since the third visitor V3 is motionless at the time points t7-t12.

As shown in FIG. 6, the distance between the first visitor V1 and the third visitor V3 at the time point t7 is smaller than the first distance threshold TH1, wherein the time point t7 is the aforesaid first identical time point. When the processor 12 determines that the distance between the first visitor V1 and the third visitor V3 at the first identical time point t7 is smaller than the first distance threshold TH1 (step S12 in FIG. 2), the processor 12 further determines whether a distance between a first initial position tr1_t1 of the first visitor V1 in the image sequence and a second initial position tr3_t2 of the third visitor V3 in the image sequence is smaller than the second distance threshold TH2 (step S16 in FIG. 2).

As shown in FIG. 6, the distance between the first initial position tr1_t1 of the first visitor V1 and the second initial position tr3_t2 of the third visitor V3 is larger than the second distance threshold TH2. When the processor 12 determines that the distance between the first initial position tr1_t1 of the first visitor V1 and the second initial position tr3_t2 of the third visitor V3 is larger than the second distance threshold TH2, the processor 12 determines that the first visitor V1 and the second visitor V2 belong to different groups (step S14 in FIG. 2).

Figure 7:
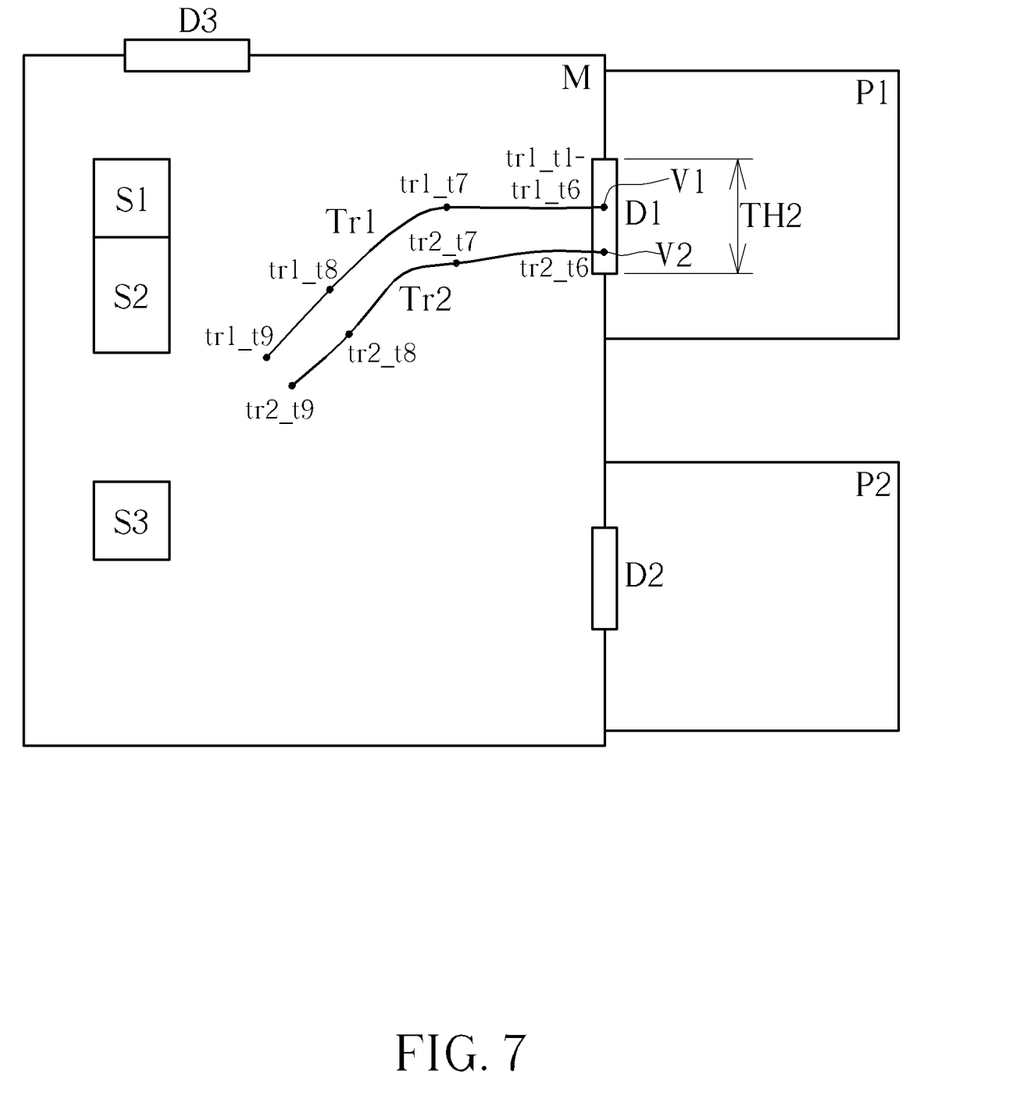
FIG. 7 is another schematic view illustrating the moving trajectories of a first visitor and a second visitor in the shopping mall.

The aforesaid method may be applied to group a plurality of visitors who enter the shopping mall at different time points and make an appointment to meet each other in front of a store. In another embodiment of the invention, the step S12 may be omitted and the method may be restricted to detect a plurality of visitors who enter the shopping mall at different time points and make an appointment to meet each other in front of an entrance/exit gate. Referring to FIG. 7, FIG. 7 is another schematic view illustrating the moving trajectories of a first visitor V1 and a second visitor V2 in the shopping mall M. As shown in FIG. 7, the first visitor V1 appears in the image sequence first time at the time point t1, wherein the point tr1_t1 represents the position of the first visitor V1 at the time point t1, the point tr1_t2 represents the position of the first visitor V1 at the time point t2, and so on. Furthermore, the points tr1_t1-tr1_t6 are labeled at an identical point since the first visitor V1 is motionless at the time points t1-t6. The second visitor V2 appears in the image sequence first time at the time point t6, wherein the point tr2_t6 represents the position of the second visitor V2 at the time point t6, the point tr2_t7 represents the position of the second visitor V2 at the time point t7, and so on. In this embodiment, after receiving the image sequence (step S10 in FIG. 2), the processor 12 may perform the step S16 immediately without performing the step S12.

Figure 8:
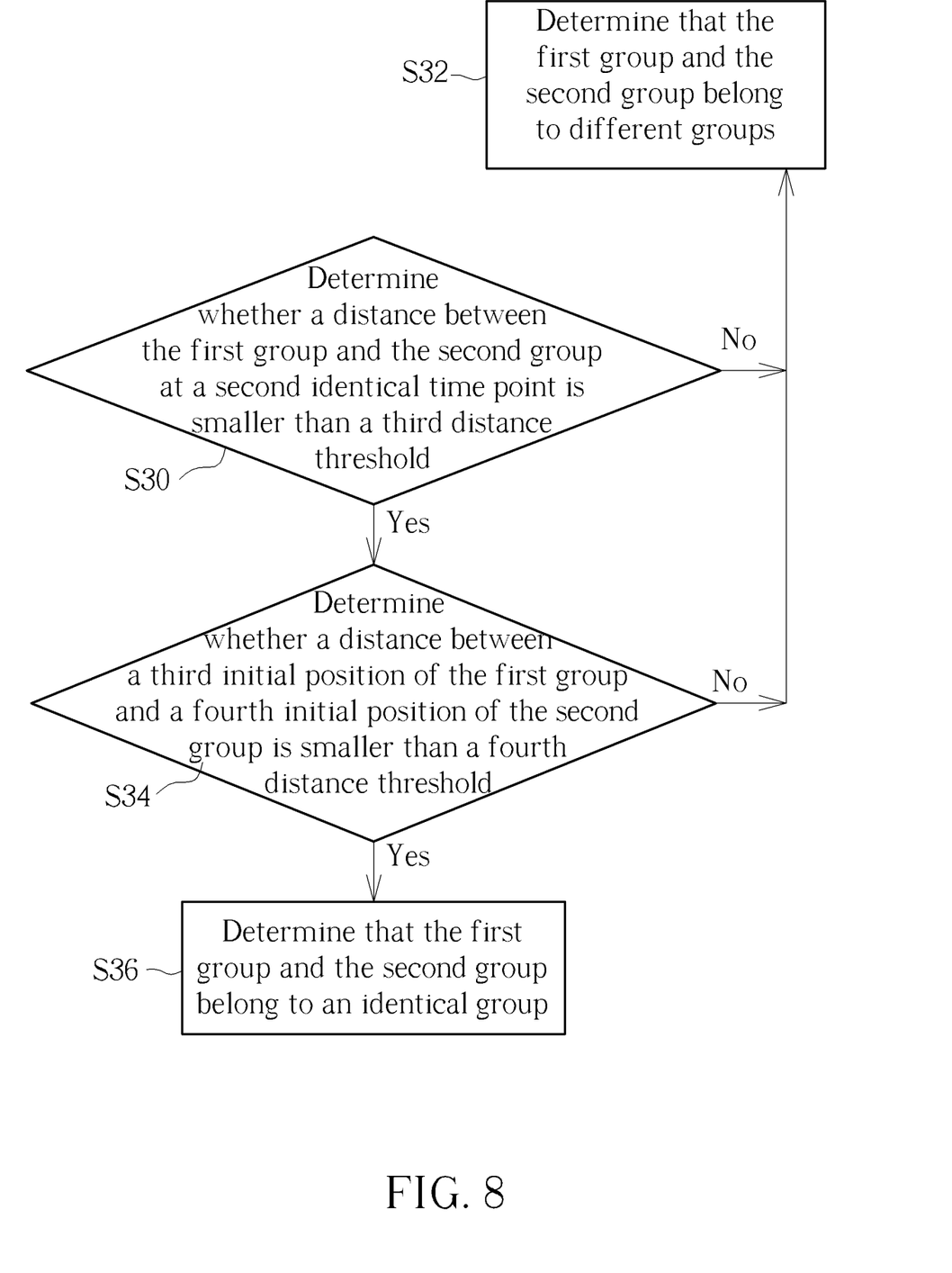
FIG. 8 is a flowchart illustrating a visitor grouping method according to another embodiment of the invention.
Figure 9:
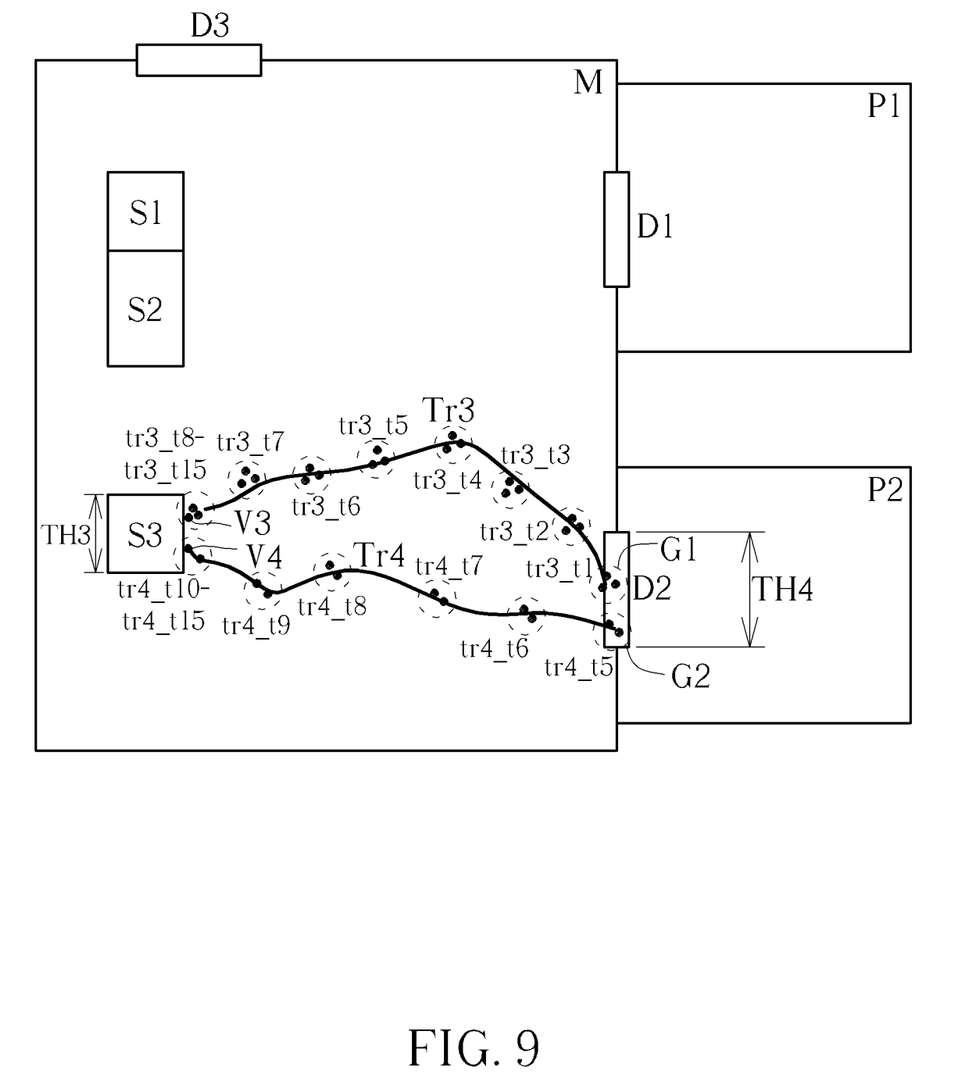
FIG. 9 is a schematic view illustrating the moving trajectories of a first group and a second group in the shopping mall.

Referring to FIGS. 8 and 9, FIG. 8 is a flowchart illustrating a visitor grouping method according to another embodiment of the invention and FIG. 9 is a schematic view illustrating the moving trajectories of a first group G1 and a second group G2 in the shopping mall M. The visitor grouping method shown in FIG. 8 may also be applied to the image processing device 1 shown in FIG. 1. As shown in FIG. 9, a first group G1 and a second group G2 exist in the image sequence, wherein the moving trajectory of the first group G1 is Tr3 and the moving trajectory of the second group G2 is Tr4. Furthermore, the first group G1 comprises three visitors and the second group G2 comprises two visitors. It should be noted that the moving trajectory Tr3 shown in FIG. 9 is different from the moving trajectory Tr3 shown in FIG. 6.

In this embodiment, the first group G1 appears in the image sequence first time at the time point t1, wherein the point tr3_t1 represents the position of the first group G1 at the time point t1, the point tr3_t2 represents the position of the first group G1 at the time point t2, and so on. Furthermore, the second group G2 appears in the image sequence first time at the time point t5, wherein the point tr4_t5 represents the position of the second group G2 at the time point t5, the point tr4_t6 represents the position of the second group G2 at the time point t6, and so on. Moreover, the points tr3_t8-tr3_t15 are labeled at an identical point since the first group G1 is motionless at the time points t8-t15, and the points tr4_t10-tr4_t15 are labeled at an identical point since the second group G2 is motionless at the time points t10-t15.

After grouping the visitors by the aforesaid method, the invention may further group different groups. First of all, the processor 12 determines whether a distance between the first group G1 and the second group G2 at a second identical time point is smaller than a third distance threshold TH3 (step S30 in FIG. 8). In this embodiment, a width of the store S3 may be set as the third distance threshold TH3, but is not so limited.

When the processor 12 determines that the distance between the first group G1 and the second group G2 at any identical time point is larger than or equal to the third distance threshold TH3, the processor 12 determines that the first group G1 and the second group G2 belong to different groups (step S32 in FIG. 8).

As shown in FIG. 9, the distance between the first group G1 and the second group G2 at the time point t10 is smaller than the third distance threshold TH3, wherein the time point t10 is the aforesaid second identical time point. When the processor 12 determines that the distance between the first group G1 and the second group G2 at the second identical time point t10 is smaller than the third distance threshold TH3, the processor 12 further determines whether a distance between a third initial position tr3_t1 of the first group G1 in the image sequence and a fourth initial position tr4_t5 of the second group G2 in the image sequence is smaller than a fourth distance threshold TH4 (step S34 in FIG. 8). In this embodiment, a width of the entrance/exit gate D2 of the shopping mall M may be set as the fourth distance threshold TH4.

When the processor 12 determines that the distance between the third initial position tr3_t1 of the first group G1 and the fourth initial position tr4_t5 of the second group G2 is larger than or equal to the fourth distance threshold TH4, the processor 12 determines that the first group G1 and the second group G2 belong to different groups (step S32 in FIG. 8).

As shown in FIG. 9, the distance between the third initial position tr3_t1 of the first group G1 and the fourth initial position tr4_t5 of the second group G2 is smaller than the fourth distance threshold TH4. When the processor 12 determines that the distance between the third initial position tr3_t1 of the first group G1 and the fourth initial position tr4_t5 of the second group G2 is smaller than the fourth distance threshold TH4, the processor 12 determines that the first group G1 and the second group G2 belong to an identical group (step S36 in FIG. 8).

In the aforesaid step S30, the processor 12 may select a third visitor V3 from the first group G1 and select a fourth visitor V4 from the second group G2, wherein a distance between the third visitor V3 and the fourth visitor V4 is shortest, as shown in FIG. 9. It should be noted that the third visitor V3 shown in FIG. 9 is different from the third visitor V3 shown in FIG. 6. Then, the processor 12 may take the distance between the third visitor V3 and the fourth visitor V4 to be the distance between the first group G1 and the second group G2.

In the aforesaid step S34, the processor 12 may take an initial position of any visitor of the first group G1 in the image sequence to be the third initial position tr3_t1 of the first group G1 in the image sequence and take an initial position of any visitor of the second group G2 in the image sequence to be the fourth initial position tr4_t5 of the second group G2 in the image sequence.

If the image processing device 1 is a depth camera or a stereo camera, the processor 12 may further analyze the image sequence to obtain a height of each visitor. In this embodiment, the first group G1 may comprise at least one third visitor and the second group G2 may comprise at least one fourth visitor. Accordingly, the processor 12 may analyze the height of each third visitor of the first group G1 and the height of each fourth visitor of the second group G2. Before determining whether the first group G1 and the second group G2 belong to an identical group, the processor 12 may determine whether at least one of the first group G1 and the second group G2 is a child group first according to the height of each third visitor and the height of each fourth visitor. For example, a threshold (e.g. 140 cm) may be set for the height of a child. When the height of a visitor is smaller than the threshold, the processor 12 determines that the group including the visitor is a child group.

Figure 10:
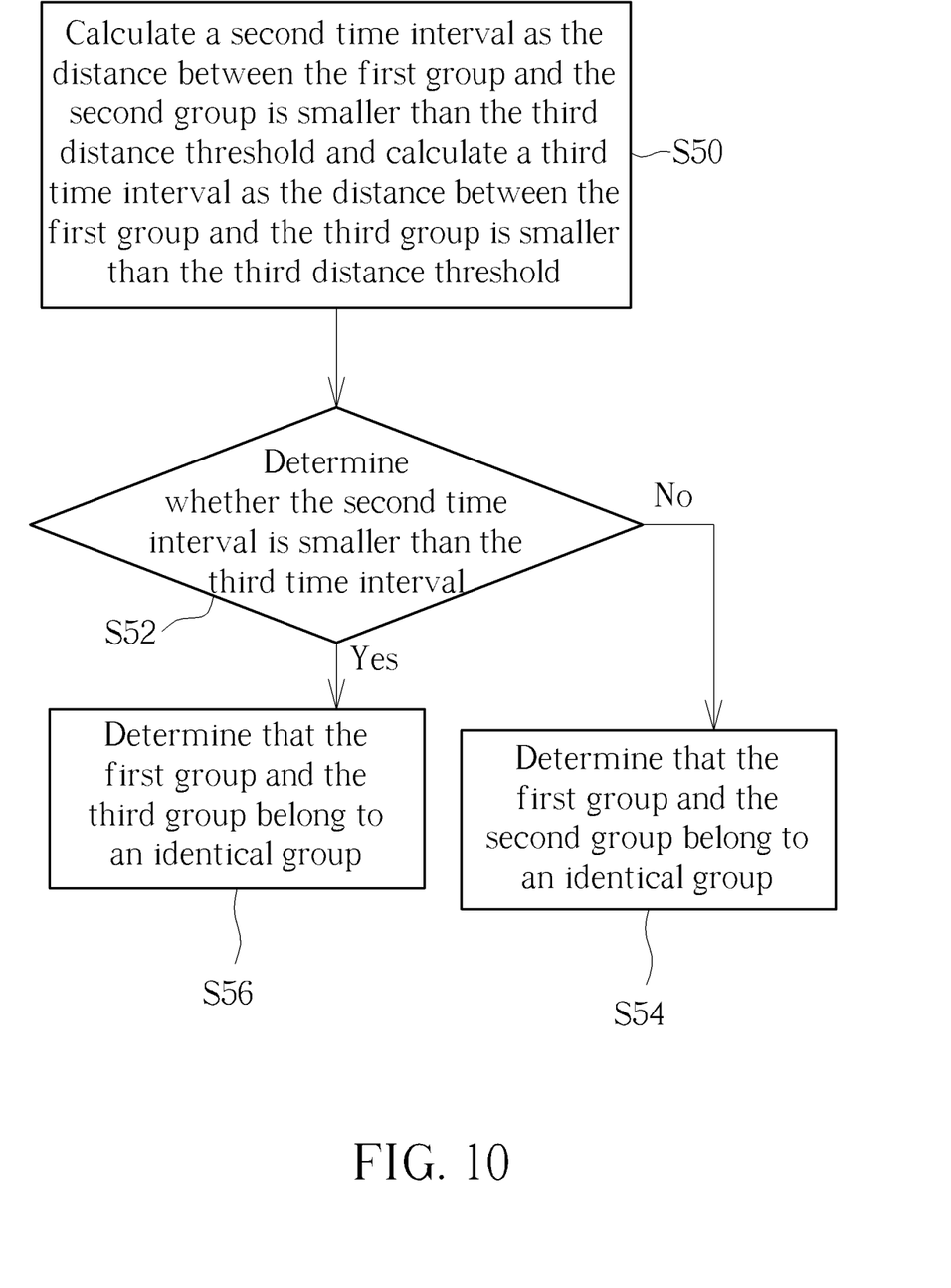
FIG. 10 is a flowchart illustrating a visitor grouping method according to another embodiment of the invention.
Figure 11:
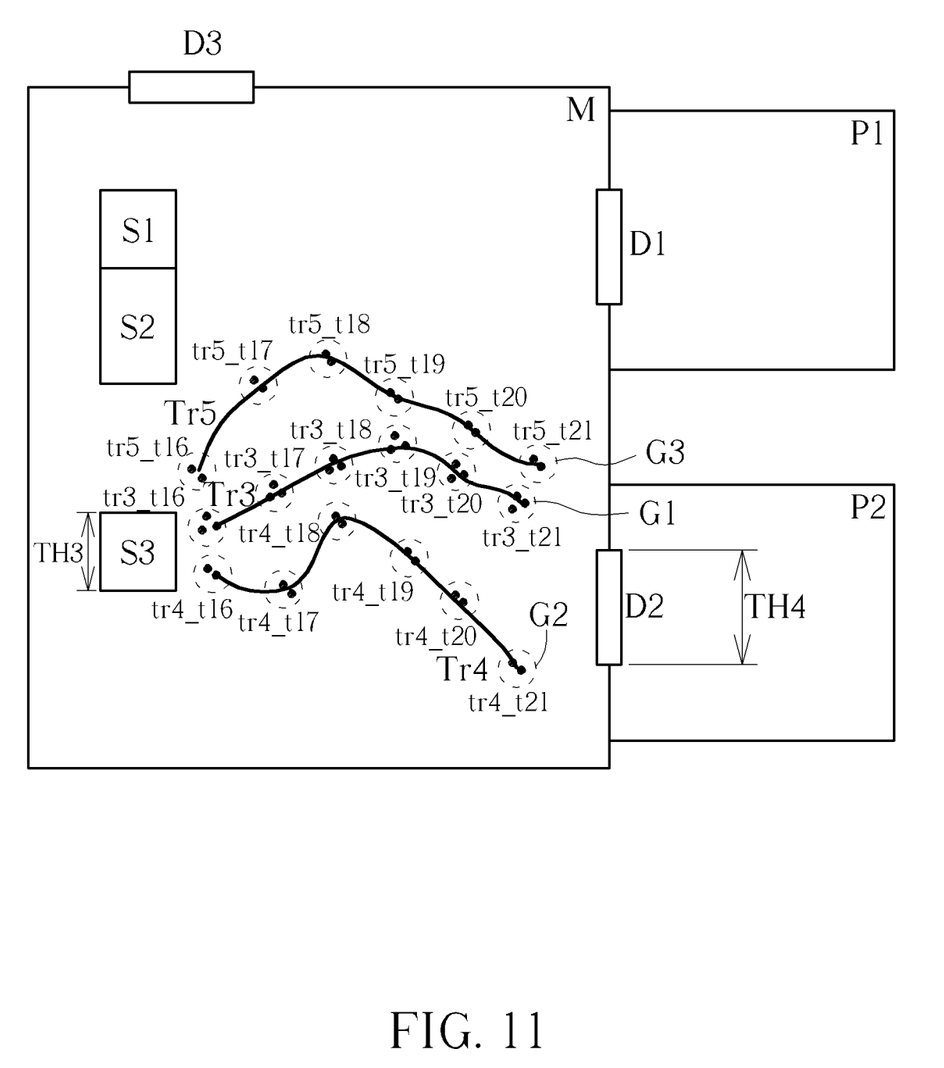
FIG. 11 is another schematic view illustrating the moving trajectories of a first group, a second group and a third group in the shopping mall.

Referring to FIGS. 10 and 11, FIG. 10 is a flowchart illustrating a visitor grouping method according to another embodiment of the invention and FIG. 11 is another schematic view illustrating the moving trajectories of a first group G1, a second group G2 and a third group G3 in the shopping mall M. The visitor grouping method shown in FIG. 10 may also be applied to the image processing device 1 shown in FIG. 1. As shown in FIG. 11, a first group G1, a second group G2 and a third group G3 exist in the image sequence, wherein the moving trajectory of the first group G1 is Tr3, the moving trajectory of the second group G2 is Tr4, and the moving trajectory of the third group G3 is Tr5. It should be noted that the moving trajectory Tr3 shown in FIG. 11 is different from the moving trajectory Tr3 shown in FIGS. 6 and 9, and the moving trajectory Tr4 shown in FIG. 11 is different from the moving trajectory Tr4 shown in FIG. 9. Furthermore, the point tr3_t16 represents the position of the first group G1 at the time point t16, the point tr3_t17 represents the position of the first group G1 at the time point t17, and so on; the point tr4_t16 represents the position of the second group G2 at the time point t16, the point tr4_t17 represents the position of the second group G2 at the time point t17, and so on; the point tr5_t16 represents the position of the third group G3 at the time point t16, the point tr5_t17 represents the position of the third group G3 at the time point t17, and so on.

According to the aforesaid visitor grouping method, it is assumed that the first group G1 is a child group, wherein either the first group G1 and the second group G2 belong to an identical group, or the first group G1 and the third group G3 belong to an identical group. The invention may further determine whether the first group G1 and the second group G2 belong to an identical group, or the first group G1 and the third group G3 belong to an identical group according to the following method. First of all, the processor 12 may calculate a second time interval TP2 as the distance between the first group G1 and the second group G2 is smaller than the third distance threshold TH3 and calculate a third time interval TP3 as the distance between the first group G1 and the third group G3 is smaller than the third distance threshold TH3 (step S50 in FIG. 10). Then, the processor 12 determines whether the second time interval TP2 is smaller than the third time interval TP3 (step S52 in FIG. 10). When the second time interval TP2 is larger than or equal to the third time interval TP3, the processor 12 determines that the first group G1 and the second group G2 belong to an identical group (step S54 in FIG. 10). When the second time interval TP2 is smaller than the third time interval TP3, the processor 12 determines that the first group G1 and the third group G3 belong to an identical group (step S56 in FIG. 10).

As shown in FIG. 11, the distance between the first group G1 and the second group G2 is larger than or equal to the third distance threshold TH3 at the time points t17 and t19-t21, and the distance between the first group G1 and the second group G2 is smaller than the third distance threshold TH3 at the time points t16, t18. Furthermore, the distance between the first group G1 and the third group G3 is larger than or equal to the third distance threshold TH3 at the time points t17-t18, and the distance between the first group G1 and the third group G3 is smaller than the third distance threshold TH3 at the time points t16 and t19-t21. If the time interval between every two adjacent time points $t_n$ and $t_{n+1}$ is 1 second, the aforesaid second time interval TP2 is 2 seconds and the aforesaid third time interval TP3 is 4 seconds accordingly. Since the second time interval TP2 is smaller than the third time interval TP3, the first group G1 and the third group G3 belong to an identical group.

As mentioned in the above, the invention determines whether different visitors belong to an identical group according to the distance between the visitors and the initial position of the visitors in the image sequence, so as to analyze a proportion of number of individual visitors to number of grouped visitors. Furthermore, the invention may further determine whether two groups belong to an identical group according to the distance between the groups and the initial positions of the groups in the image sequence. Moreover, the invention may determine whether there is a child group first and then combine the child group with other groups. Accordingly, a specific site may design the display content and manner with respect to the properties of the visitors, so as to enhance service quality and operating efficiency. Furthermore, a retail store may estimate the operating efficiency by analyzing a proportion of number of purchasers to number of all visitors.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A visitor grouping method comprising steps of:
   receiving an image sequence, wherein a first visitor and a second visitor exist in the image sequence;
   determining whether a distance between the first visitor and the second visitor at a first identical time point is smaller than a first distance threshold;
   when determining that the distance between the first visitor and the second visitor at the first identical time point is smaller than the first distance threshold, determining whether a distance between a first initial position of the first visitor in the image sequence and a second initial position of the second visitor in the image sequence is smaller than a second distance threshold;
   when determining that the distance between the first initial position and the second initial position is smaller than the second distance threshold, calculating a first time interval as the distance between the first visitor and the second visitor is larger than or equal to the first distance threshold every time after the first identical time point;
   determining whether the first time interval is smaller than a time threshold; and
   when determining that the first time interval is smaller than a time threshold, determining that the first visitor and the second visitor belong to an identical group.

2. The visitor grouping method of claim 1, further comprising step of:
   when determining that the distance between the first visitor and the second visitor at any identical time point is larger than or equal to the first distance threshold, determining that the first visitor and the second visitor belong to different groups.

3. The visitor grouping method of claim 1, further comprising step of:
   when determining that the distance between the first initial position and the second initial position is larger than or equal to the second distance threshold, determining that the first visitor and the second visitor belong to different groups.

4. The visitor grouping method of claim 1, further comprising step of:
   when determining that the first time interval is larger than or equal to the time threshold, determining that the first visitor and the second visitor belong to different groups.

5. The visitor grouping method of claim 1, wherein a first group and a second group exist in the image sequence, and the visitor grouping method further comprises steps of:
   determining whether a distance between the first group and the second group at a second identical time point is smaller than a third distance threshold;
   when determining that the distance between the first group and the second group at any identical time point is larger than or equal to the third distance threshold, determining that the first group and the second group belong to different groups;
   when determining that the distance between the first group and the second group at the second identical time point is smaller than the third distance threshold, determining whether a distance between a third initial position of the first group in the image sequence and a fourth initial position of the second group in the image sequence is smaller than a fourth distance threshold;
   when determining that the distance between the third initial position and the fourth initial position is larger than or equal to the fourth distance threshold, determining that the first group and the second group belong to different groups; and
   when determining that the distance between the third initial position and the fourth initial position is smaller than the fourth distance threshold, determining that the first group and the second group belong to an identical group.

6. The visitor grouping method of claim 5, further comprising steps of:
   selecting a third visitor from the first group and selecting a fourth visitor from the second group, wherein a distance between the third visitor and the fourth visitor is shortest; and
   taking the distance between the third visitor and the fourth visitor to be the distance between the first group and the second group.

7. The visitor grouping method of claim 5, further comprising steps of:
   taking an initial position of any visitor of the first group in the image sequence to be the third initial position of the first group in the image sequence; and
   taking an initial position of any visitor of the second group in the image sequence to be the fourth initial position of the second group in the image sequence.

8. The visitor grouping method of claim 5, wherein the first group comprises at least one third visitor, the second group comprises at least one fourth visitor, and the visitor grouping method further comprises steps of:
   analyzing a height of the at least one third visitor and a height of the at least one fourth visitor; and
   before determining whether the first group and the second group belong to an identical group, determining whether at least one of the first group and the second group is a child group first according to the height of the at least one third visitor and the height of the at least one fourth visitor.

9. The visitor grouping method of claim 8, wherein a third group exists in the image sequence, the first group is the child group, either the first group and the second group belong to an identical group, or the first group and the third group belong to an identical group, and the visitor grouping method further comprises steps of:

calculating a second time interval as the distance between the first group and the second group is smaller than the third distance threshold and calculating a third time interval as a distance between the first group and the third group is smaller than the third distance threshold;

when the second time interval is larger than or equal to the third time interval, determining that the first group and the second group belong to an identical group; and     when the second time interval is smaller than the third time interval, determining that the first group and the third group belong to an identical group.

10. An image processing device comprising:

an image receiver receiving an image sequence, wherein a first visitor and a second visitor exist in the image sequence; and a processor electrically connected to the image receiver;

wherein the processor determines whether a distance between the first visitor and the second visitor at a first identical time point is smaller than a first distance threshold; when the processor determines that the distance between the first visitor and the second visitor at the first identical time point is smaller than the first distance threshold, the processor determines whether a distance between a first initial position of the first visitor in the image sequence and a second initial position of the second visitor in the image sequence is smaller than a second distance threshold; when the processor determines that the distance between the first initial position and the second initial position is smaller than the second distance threshold, the processor calculates a first time interval as the distance between the first visitor and the second visitor is larger than or equal to the first distance threshold every time after the first identical time point; the processor determines whether the first time interval is smaller than a time threshold; when the processor determines that the first time interval is smaller than a time threshold, the processor determines that the first visitor and the second visitor belong to an identical group.

11. The image processing device of claim 10, wherein when the processor determines that the distance between the first visitor and the second visitor at any identical time point is larger than or equal to the first distance threshold, the processor determines that the first visitor and the second visitor belong to different groups.

12. The image processing device of claim 10, wherein when the processor determines that the distance between the first initial position and the second initial position is larger than or equal to the second distance threshold, the processor determines that the first visitor and the second visitor belong to different groups.

13. The image processing device of claim 10, wherein when the processor determines that the first time interval is larger than or equal to the time threshold, the processor determines that the first visitor and the second visitor belong to different groups.

14. The image processing device of claim 10, wherein a first group and a second group exist in the image sequence; the processor determines whether a distance between the first group and the second group at a second identical time point is smaller than a third distance threshold; when the processor determines that the distance between the first group and the second group at any identical time point is larger than or equal to the third distance threshold, the processor determines that the first group and the second group belong to different groups; when the processor determines that the distance between the first group and the second group at the second identical time point is smaller than the third distance threshold, the processor determines whether a distance between a third initial position of the first group in the image sequence and a fourth initial position of the second group in the image sequence is smaller than a fourth distance threshold; when the processor determines that the distance between the third initial position and the fourth initial position is larger than or equal to the fourth distance threshold, the processor determines that the first group and the second group belong to different groups; when the processor determines that the distance between the third initial position and the fourth initial position is smaller than the fourth distance threshold, the processor determines that the first group and the second group belong to an identical group.

15. The image processing device of claim 14, wherein the processor selects a third visitor from the first group and selects a fourth visitor from the second group, a distance between the third visitor and the fourth visitor is shortest; the processor takes the distance between the third visitor and the fourth visitor to be the distance between the first group and the second group.

16. The image processing device of claim 14, wherein the processor takes an initial position of any visitor of the first group in the image sequence to be the third initial position of the first group in the image sequence; the processor takes an initial position of any visitor of the second group in the image sequence to be the fourth initial position of the second group in the image sequence.

17. The image processing device of claim 14, wherein the first group comprises at least one third visitor, the second group comprises at least one fourth visitor; the processor analyzes a height of the at least one third visitor and a height of the at least one fourth visitor; before determining whether the first group and the second group belong to an identical group, the processor determines whether at least one of the first group and the second group is a child group first according to the height of the at least one third visitor and the height of the at least one fourth visitor.

18. The image processing device of claim 17, wherein a third group exists in the image sequence, the first group is the child group, either the first group and the second group belong to an identical group, or the first group and the third group belong to an identical group; the processor calculates a second time interval as the distance between the first group and the second group is smaller than the third distance threshold and calculates a third time interval as a distance between the first group and the third group is smaller than the third distance threshold; when the second time interval is larger than or equal to the third time interval, the processor determines that the first group and the second group belong to an identical group; when the second time interval is smaller than the third time interval, the processor determines that the first group and the third group belong to an identical group.

* * * * *